(12) United States Patent
Grimsrud

(10) Patent No.: US 6,651,113 B1
(45) Date of Patent: Nov. 18, 2003

(54) SYSTEM FOR WRITING DATA ON AN OPTICAL STORAGE MEDIUM WITHOUT INTERRUPTION USING A LOCAL WRITE BUFFER

(75) Inventor: Knut Grimsrud, Forest Grove, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/470,287

(22) Filed: Dec. 22, 1999

(51) Int. Cl.[7] .................. G06F 13/14; G06F 13/28
(52) U.S. Cl. .................. 710/22; 710/33; 710/52; 711/100; 711/101
(58) Field of Search .................. 710/22, 33, 52; 711/100, 101

(56) References Cited

U.S. PATENT DOCUMENTS

| | | | |
|---|---|---|---|
| 4,672,613 A | * 6/1987 | Foxworthy et al. | 710/22 |
| 5,034,914 A | * 7/1991 | Osterlund | 360/48 |
| 5,301,351 A | * 4/1994 | Jippo | 709/228 |
| 5,386,524 A | * 1/1995 | Lary et al. | 711/206 |
| 5,586,264 A | * 12/1996 | Belknap et al. | 725/115 |
| 5,613,141 A | * 3/1997 | Szatkowski et al. | 710/2 |
| 5,828,903 A | * 10/1998 | Sethuram et al. | 709/212 |
| 5,875,455 A | * 2/1999 | Ito | 710/52 |
| 5,917,723 A | * 6/1999 | Binford | 700/11 |
| 5,933,653 A | * 8/1999 | Ofek | 710/6 |

OTHER PUBLICATIONS

"What does "buffer underrun" mean?," http://www.fadden.com/cdrfaq/faq04.html, i pg., viewed Oct. 13, 1999.
"Direct Memory Access," http:webclass.cqu.edu.au/Units/81120_FOCT_Hardware/Study_Material/Stu . . . /chapter5.htm, 8 pp., viewed Oct. 19, 1999.
The PC Technology Guide, CD–ROM, http://www.pctechguide.com/08cdrom2.htm, 7 pp., viewed Sep. 22, 1999.
The PC Technology Guide, Hard Disks, http://www.pctechguide.com/04disks.htm, 9 pp., viewed Sep. 22, 1999.
The PC Technology Guide, CD–R/CD–RW, http://www.pctechguide.com/09cdr–rw.htm, 9 pp., viewed Oct. 21, 1999.

* cited by examiner

Primary Examiner—Rehana Perveen
(74) Attorney, Agent, or Firm—Fish & Richardson P.C.

(57) ABSTRACT

A method for writing data on an optical storage medium in an optical storage device includes transferring data by a direct memory access process from a host buffer allocated in a memory of a host device to a local write buffer associated with the optical storage device. The data is then written from the write buffer to the optical storage medium.

19 Claims, 4 Drawing Sheets

SYSTEM FOR WRITING DATA ON AN OPTICAL STORAGE MEDIUM WITHOUT INTERRUPTION USING A LOCAL WRITE BUFFER

BACKGROUND OF THE INVENTION

This invention relates to writing data on an optical storage medium.

When data is written to a recordable optical device, one common recording scheme requires that the data be continuously written at the recording rate of the optical device without interruption until the recording medium in the device is completely recorded. During writing, the data is transferred from, e.g., a main memory of a host computer, a hard drive, a tape, or another optical disk; to a temporary memory location (referred to as the write buffer) on the drive of the optical device and is pulled out of the write buffer in a first-in-first-out (FIFO) basis as needed for writing on the disk. If the write buffer is empty when the recorder requests data at any point during the recording process, the recording process aborts and the CD-R is typically ruined. The emptying of the write buffer while the recorder still needs data is referred to as buffer underrun.

As CD-R recording rates increase to 2×, 10× and even 40×, even small interruptions in data transfer to the write buffer can produce buffer underrun. To reduce the chance of buffer underrun, conventional recordable optical devices include a write buffer with a large data storage capacity. Thus, there is a tradeoff between increasing the recording rate and avoiding the high cost associated with larger write buffer memories.

SUMMARY OF THE INVENTION

In one embodiment, the invention is a method for writing data on an optical storage medium in an optical storage device. The method includes transferring data by a direct memory access process from a host buffer allocated in a memory of a host device to a local write buffer associated with the optical storage device. The data is then written from the write buffer to the optical storage medium.

In another embodiment, the invention is an electronic device that includes a memory, a direct memory access controller, a data storage medium in an optical storage. device, and a driver for the optical storage device. The driver is programmed to execute instructions to write the medium, including transfer of data to a host buffer allocated in the memory of the device, and activation of the direct memory access controller to transfer data by a direct memory access process from the host buffer to a local write buffer associated with the optical storage device.

In a third embodiment, the invention is an article comprising a computer-readable medium that stores computer-executable instructions for writing an optical medium in an optical device. The instructions cause a computer to transfer data to a host buffer allocated in the memory of the device and activate the direct memory access controller to transfer data by a direct memory access process from the host buffer to a local write buffer associated with the optical storage device. Data in the host buffer are available to the write buffer such that the write buffer is not underrun while the data storage medium is completely written without interruption.

In a fourth embodiment, the invention is a recordable optical device having a write buffer with a data storage capacity of less than about 256 kB, preferably about 32 kB.

A fifth embodiment of the invention is an optical data storage system including an optical device having a data storage medium, and an article comprising a computer-readable medium that stores computer-executable instructions for writing the optical medium. The instructions cause a computer to transfer data to a host buffer allocated in the memory of the device; and activate the direct memory access controller to transfer data by a direct memory access process from the host buffer to a local write buffer associated with the optical storage device. The data in the host buffer are available to the write buffer such that the write buffer is not underrun while the data storage medium is completely written without interruption.

A sixth embodiment of the invention is an electronic device that includes a recordable optical storage device and a host device with a main memory. A device driver is interfaced with the optical storage device, and a direct memory access controller is interfaced with the optical storage device. The device driver is programmed to execute steps to write the optical storage device, including allocating a portion of the main memory as a host buffer, and transferring data FIFO, using the direct memory access controller, between the host buffer and a write buffer in the optical device. Data in the host buffer is available to the write buffer such that the write buffer is not underrun while the data storage medium is completely written without interruption.

Among the advantages of the invention are one or more of the following. The write buffer on the recordable optical device requires less storage capacity to avoid buffer underrun. The rate specific data transfer steps minimize the effect of software latency on the recording process for the optical device, and require only a modest write buffer on the recordable optical device to absorb hardware latencies. The cost of an optical storage device is reduced without adding significant new infrastructure on the host or requiring extensive modification to existing host hardware. Existing legacy host DMA engines can be used to deliver the capabilities necessary to reduce recordable optical device buffering requirements.

DESCRIPTION OF THE PREFERRED EMBODIMENTS

Figure 1:
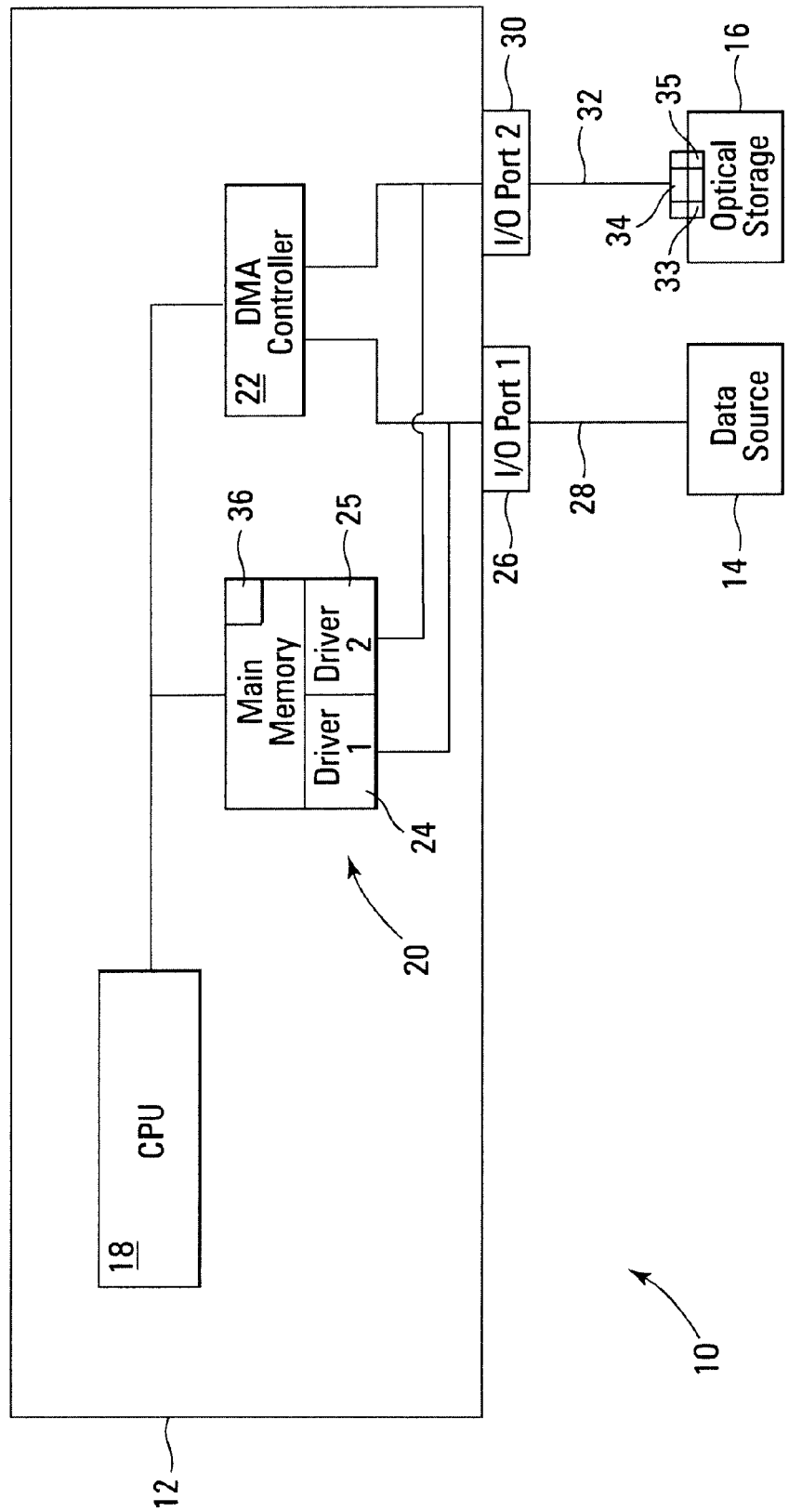
FIG. 1 is a schematic representation of hardware infrastructure that may be used to execute the data transfer processes of the invention.

Referring to FIG. 1, in one implementation of the invention, a hardware system 10 includes a host device 12, a data source 14 and a recordable optical storage device 16. The host device 12 includes a processor 18, a main host memory 20, and a direct memory access (DMA) controller 22. The DMA controller 22 is a facility for moving/copying data to/from a host memory to the I/O bus. The DMA controller 22 controls data transfers between the main host memory 20 and an input/output (I/O) subsystem such as the mass storage device 14 and the recordable optical storage device 16.

The DMA controller 22 is connected to the first input/output (I/O) port 26. A data bus 28 is connected to the I/O port 26 and allows a first driver 24 to interface with the data source 14. The data source 14 may be any known data storage device, such as a hard disk, a tape drive, another optical storage device, an internet connection, a satellite receiver, and the like.

The DMA controller 22 is also connected to the second I/O port 30. A data bus 32 is connected to the I/O port 28 and allows a second driver 25 to interface with the recordable optical device 16.

The recordable optical device 16 includes a recording medium 33 and a drive 34. A typical recordable optical device 16 is a recordable compact disk (CD), referred to as a CD-R. To write data on the recording medium, a laser in the drive alters the surface of the recording medium according to the data. If a heating system is used to perform the write process, the altered or "burned" area becomes opaque (absorptive at the laser read wavelength) when heated beyond a critical temperature, and subsequently reflects less light than areas that have not been heated by the laser. Once a location on the recording medium is written with data, the change in the medium is permanent, so the burned areas of the medium cannot be erased or re-written.

During the write process, the drive 34 for the optical device is designed to maintain a constant rate of data transfer to the laser. An internal temporary memory area on the drive 34, referred to herein as the write buffer 35, controls data transfer to the laser by using an oscillator to clock the data out of the buffer at a specific rate during recording. The recording medium 33 in the optical device 16 rotates at a constant velocity underneath the laser during the writing process. Throughout the writing process the laser must receive the data it needs in a constant, smooth flow from the write buffer 35. The faster the drive 34 spins the disk-shaped medium 33 during the write process, the more data flow is required. The medium 33 cannot be stopped during the write process, so the laser cannot wait for the data if it is delayed, and the entire medium must be written in one continuous operation. Any significant interruptions in data flow during the write procedure will deplete the write buffer 35 and abort the recording procedure, an event referred to as buffer underrun.

Conventional CD-Rs have a data storage capacity of about 670 Mb, so a large amount of data must be transferred to the drive 34 and written on the medium 33 during the write process. The write buffer 34 on the optical storage device 16 has a data storage capacity sufficient to provide elasticity as data is transferred to the optical device 16 during the write process. A designated portion 36 of the main memory 20 in the host device 12 assumes the role of the optical device buffer, so the write buffer 34 does not require significant data storage capacity. The use of the main memory 20 as an optical device buffer allows the memory capacity of the optical device buffer to be reduced from the conventional 2 MB to less than about 512 kB, more preferably less than about 256 kB, most preferably about 32 kB. This reduced buffering requirement substantially reduces the cost and complexity of the drive for the optical device.

Figure 2:
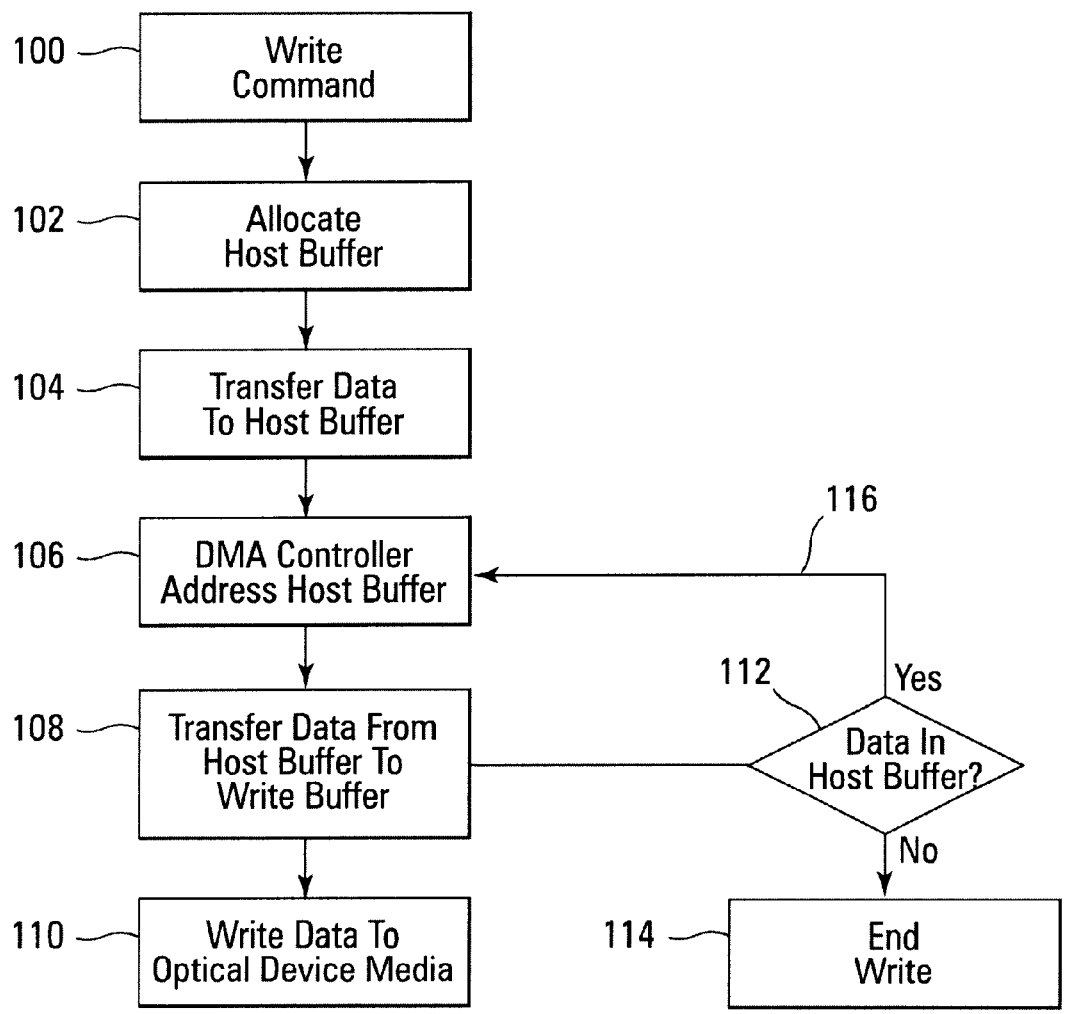
FIG. 2 is a flow chart of the program steps in the software of the invention.

One embodiment of the invention is a method for writing data on an optical storage medium. As illustrated schematically in FIG. 2, a write command is issued in block 100 by a software application to write data onto the optical device. In block 102 the device driver 25 for the optical storage device designates an address in the main memory 20 of the host device 12 as a host buffer 36 for the optical device 16.

In response to the write command, in block 104, the driver 24 for the data source transfers data from data source 14 to the host buffer 36. According to the software application, data are continuously pushed into the host buffer 36 until the write procedure is completed.

In block 106 the driver 25 requests use of the host DMA controller 22 to establish a DMA loop or chain to continuously transfer the data from the host buffer 36 to the write buffer 35. In this step the scatter/gather list for the DMA controller 22 includes entries designated to point to the address in the host's main memory that serves as the host buffer 36. In block 108 the data are transferred, using a DMA process, from the host buffer 36 to the write buffer 35. In block 110 the drive 34 takes these data from the write buffer 35 and writes them on the optical medium 33.

During the write procedure data is constantly pushed into the host buffer 36 by the software application issuing the write command. To ensure a supply of a substantially uninterrupted stream of data to the write buffer 35, the host buffer 36 must be filled with data ahead of the DMA transfers from the host buffer 36 to the write buffer 35. The device driver 25 periodically queries the progress of the write procedure as shown in block 112 by evaluating the amount of data remaining in the host buffer 36. If no data remains in the host buffer 36, or if the amount of data in the host buffer 36 has fallen below a predetermined level, the media 33 in the optical device is completely written. The write procedure ends in block 114, and the DMA link is aborted and re-set. If data remains in the host buffer 36, the DMA controller 22 is again activated at 116 to address the host buffer 36 and transfer data from the host buffer 36 to the write buffer 35.

In step 116 the DMA controller 22 repeatedly addresses the host buffer 36 multiple times as necessary to continuously pull data in a first-in-first-out (FIFO) process from the host buffer 36 and deliver the data in an uninterrupted data stream to the write buffer 35. This repeated address operates the DMA engine circularly to keep the smaller write buffer 35 adequately filled with data to prevent underrun in the write buffer 35 during the write process.

Figure 3:
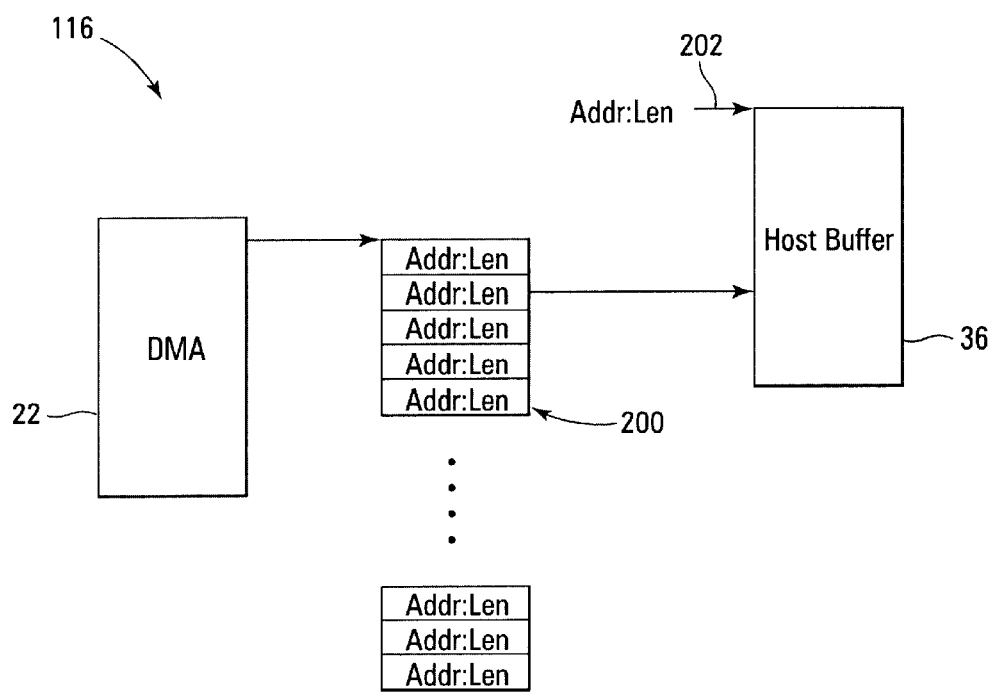
FIG. 3 is a schematic representation of the program steps in software of the invention.
Figure 4:
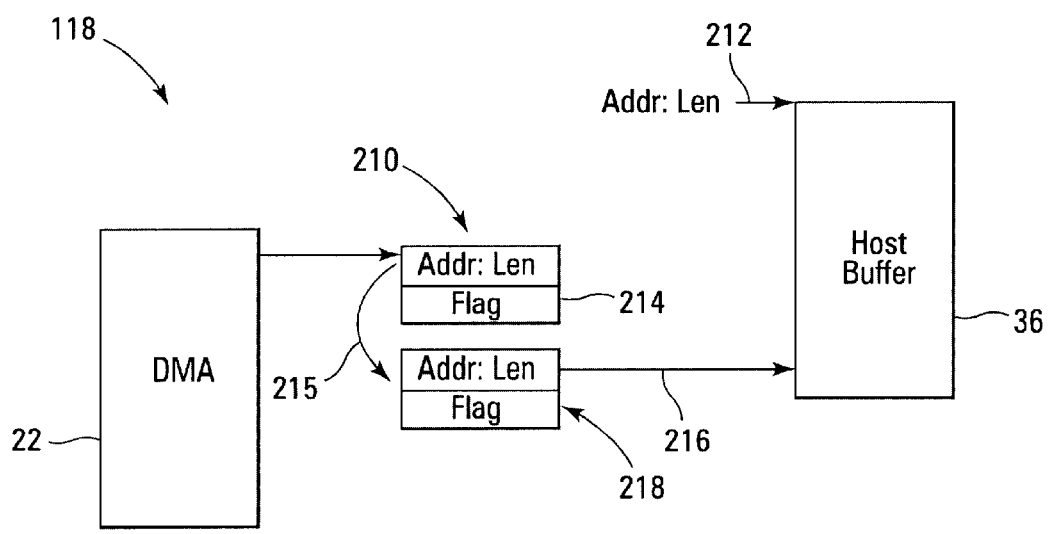
FIG. 4 is a schematic representation of the program steps in software of the invention.

This circular operation of the DMA controller 22 may be accomplished in a number of ways. For example, referring to FIG. 3, the DMA engine 22 in the host 12 is programmed with a scatter/gather list 200 that includes entries designated to point at 202 to the main memory address designated as the host buffer 36. The entries in the scatter/gather list 200 pointing to the host buffer 36 may be repeated a number of times as necessary to accommodate the maximum recording capacity of the medium 33 in the optical storage device 16 so that the device may be completely written without interruption. In this process the DMA engine 22 operates circularly to provide an uninterrupted data stream to the write buffer 35 until the write process is complete. In an alternative procedure illustrated in FIG. 4, the DMA scatter/gather list 210 may once again include an address at 212 pointing to the main memory region designated as the host buffer 36. An end of the scatter/gather list 21Q includes a flag or marker 214. The flag 214 provides explicit circular support that points the DMA controller at 215 back to another scatter/gather list 218. The scatter/gather list 218 could, for example, point back to the beginning of the same list 210 to continuously address the host buffer 36 at 216 and transfer data in an uninterrupted stream to the write buffer 35 until the medium in the optical device is completely written.

The procedures described above may be implemented by a software package supplied with the optical device 16. The software will typically be recorded on a computer readable data storage medium such as a floppy disk, a CD-ROM or the like. The software in the package contains program code that may be loaded into the device driver 25 and recognized by the driver 25. The device driver 25 then executes instructions to implement the processes shown in FIGS. 1–4. With the exception of the embodiment that relies upon explicit DMA flag support (FIG. 4), no new hardware infrastructure need be added on the host device to implement the processes of this invention, so existing legacy host DMA controllers may be used to complete the data transfers necessary to reduce the buffering requirements on the optical device.

Other embodiments are within the scope of the following claims.

What is claimed is:

1. A method for writing data on an optical storage medium in an optical storage device, comprising:

designating an address in the a main memory of a host device as a host buffer for the optical storage device;

continuously pulling data by a circular direct memory access process from the host buffer;

delivering the data in an uninterrupted stream from the host buffer to a local write buffer associated with the optical storage device such that the write buffer is not underrun while the optical storage medium is completely written without interruption.

2. The method of claim 1, wherein the data is transferred to the host buffer from a data source.

3. The method of claim 2, wherein the data source is selected from the group consisting of a hard disk drive, an internet connection, a satellite receiver or an optical storage device.

4. The method of claim 1, wherein a host direct memory access controller interfaced with the optical storage device conducts the direct memory access process.

5. The method of claim 2, wherein data is transferred to the host buffer at a first rate, data is transferred to the write buffer at a second rate, and the first rate exceeds the second rate until the optical storage medium is completely written.

6. The method of claim 1, wherein the write buffer has a data storage capacity of less than about 256 kB.

7. The method of claim 1, wherein the write buffer has a data storage capacity of about 32 kB.

8. An electronic device comprising:

a memory in a host device, a direct memory access controller, a data storage medium in an optical storage device, and a driver for the optical storage device, wherein the driver is programmed to execute the following instructions to write the medium:

transfer data to a host buffer allocated in the memory of the host device; and activate the direct memory access controller to continuously pull data by a circular direct memory access process from the host buffer to a local write buffer associated with the optical storage device such that the local write buffer is adequately filled with data to prevent underrun in the write buffer while the data storage medium is completely written without interruption.

9. The device of claim 8, wherein the data is transferred to the host buffer from a data source selected from the group consisting of a hard disk drive, an internet connection, a satellite receiver or an optical storage device.

10. The device of claim 8, wherein the write buffer has a data storage capacity of less than about 256 kB.

11. The device of claim 8, wherein the write buffer has a data storage capacity of about 32 kB.

12. An electronic device comprising:

a recordable optical storage device with a data storage medium; and a host device comprising a main memory, a device driver interfaced with the optical storage device, and a direct memory access controller interfaced with the optical storage device, wherein the device driver is programmed to execute the following steps to write the medium:

(a) allocate a region in the main memory as a host buffer;

(b) provide a scatter/gather list for the direct memory access controller, wherein the scatter/gather list includes entries that point to the host buffer;

(c) execute the scatter/gather list to transfer data with the direct memory access controller between the host buffer and a write buffer on the optical device;

(d) write the medium in the optical device with the data in the write buffer; and (e) repeating the scatter/gather list until a sufficient amount of data is transferred from the host buffer to the optical device to write the device, wherein data in the host buffer is available to the write buffer such that the write buffer is not underrun while the optical medium is completely written without interruption.

13. An article comprising a computer-readable medium that stores computer-executable instructions for writing an optical medium in an optical device, the instructions causing a computer to:

(a) transfer data to a host buffer allocated in the memory of a host device; and (b) activate the direct memory access controller to continuously transfer data by a circular direct memory access process from the host buffer to a local write buffer associated with the optical storage device, wherein data in the host buffer is available to the write buffer such that the write buffer is not underrun while the data storage medium is completely written without interruption.

14. An article comprising a computer-readable medium that stores computer-executable instructions for writing an optical medium in an optical device, the instructions causing a computer to:

(a) allocate a memory region in a host device as a host buffer for the optical storage device;

(b) establish a link for direct memory access transfer of data using a direct memory access controller from the host buffer to a write buffer on the optical storage device, wherein the controller includes a scatter/gather list with entries that point to the host buffer, and wherein the scatter/gather list includes a flag that points the controller to the beginning of another list; and (c) repeating the scatter/gather list until a sufficient amount of data is transferred from the host buffer to the optical device to write the device, wherein data in the host buffer is available to the write buffer such that the write buffer is not underrun while the optical medium is completely written without interruption.

15. The electronic device as claimed in claim 12, wherein the write buffer has a data storage capacity of less than about 256 kB.

16. The electronic device as claimed in claim 15, wherein the write buffer has a data storage capacity of about 32 kB.

17. An optical data storage system comprising:

an optical device having a data storage medium, and an article comprising a computer-readable medium that stores computer-executable instructions for writing the optical medium, the instructions causing a computer to:
- (a) allocate an array of memory regions in the main memory of a host device as a host buffer for the optical storage device;
- (b) transfer data to the host buffer from a mass storage device;
- (c) address the host buffer to transfer data, using a circular direct memory access process, to continuously transfer data between the host buffer and a write buffer on the optical storage device; and
- (d) repeat step (c) such that the write buffer is not underrun until the optical device is completely written without interruption.

18. The system of claim 17, wherein the repeating step (d) comprises:

querying the progress of a write process in the optical recorder; and, if the write process is not complete, querying a level of data remaining in the host buffer, and
- (i) if sufficient data remains in the host buffer to provide a continuous write, returning to step (c); and
- (ii) if insufficient data remains in the host buffer to provide a continuous write, returning to step (b).

19. An electronic device, comprising:

a recordable optical storage device; and a host device comprising a main memory, a device driver interfaced with the optical storage device, and a direct memory access controller interfaced with the optical storage device, wherein the device driver is programmed to execute the following steps to write the optical storage device:
- (a) allocate a portion of the main memory as a host buffer;
- (b) transfer data FIFO, using the direct memory access controller, between the host buffer and a write buffer in the optical device; wherein data in the host buffer is available to the write buffer such that the write buffer is not underrun while the data storage medium is completely written without interruption.

* * * * *